United States Patent Office.

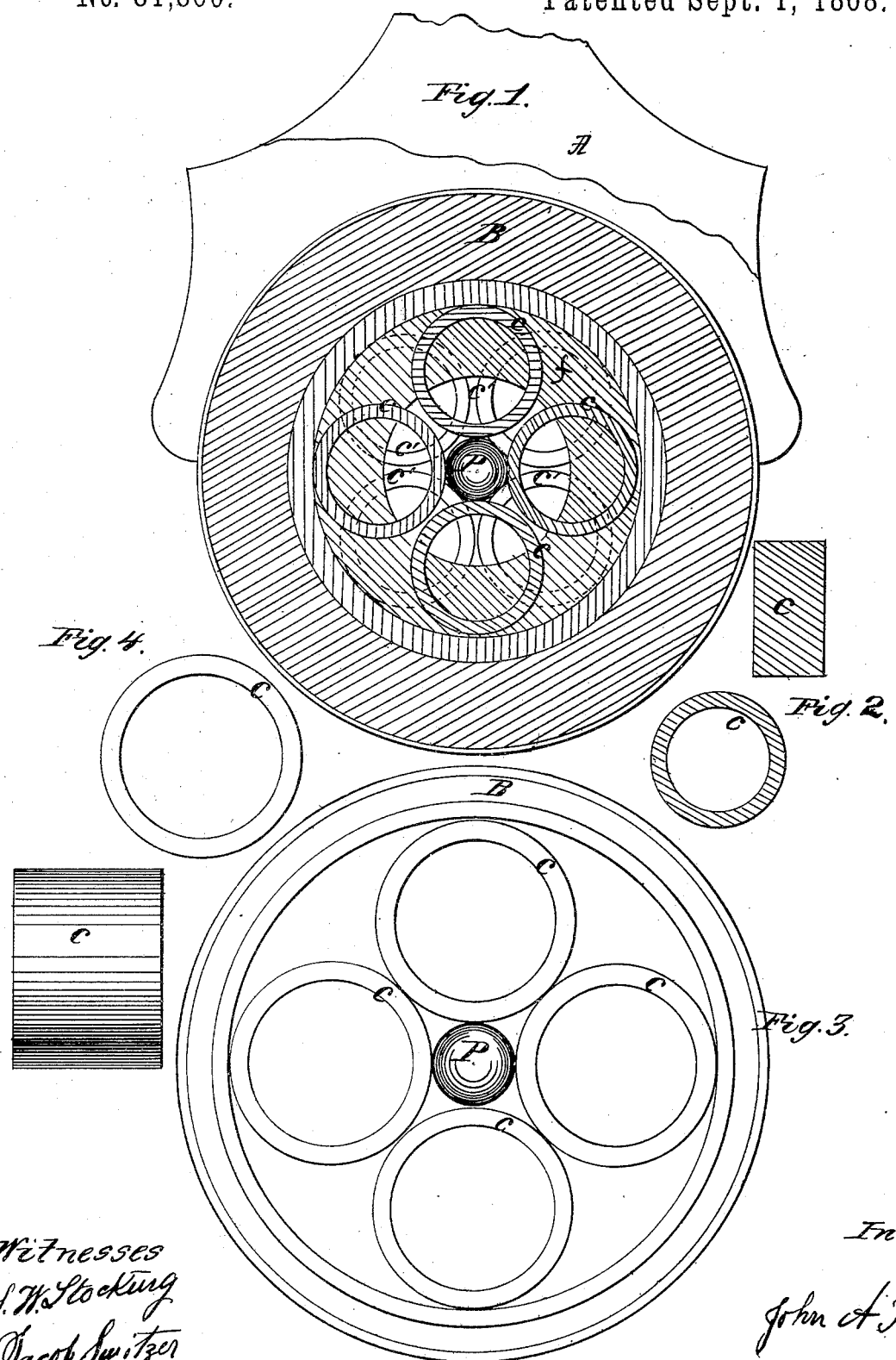

JOHN A. BURNAP, OF ALBANY, NEW YORK.

Letters Patent No. 81,860, dated September 1, 1868.

IMPROVEMENT IN PULLEYS.

The Schedule referred to in these Letters Patent and making part of the same.

TO ALL WHOM IT MAY CONCERN:

Be it known that I, JOHN A. BURNAP, of the city of Albany, county of Albany, and State of New York, have invented a new and useful Improvement in Friction-Rollers for Pulleys, Wheels, &c., for the purpose of diminishing the friction of and facilitating the revolutions of pulleys and other wheels; and I do hereby declare that the following is a full, clear, and exact description of the construction and operation of the same, reference being had to the accompanying drawings, making a part of this specification, in which—

Figure 1 is a view of the pulley B, with its rollers $c\ c\ c\ c$ and $c'\ c'\ c'\ c'$, and of the block A, with a portion of it broken away. P is the pin on which the pulley B revolves. F is a flange, in the eye of the pulley B, which separates the two series of rollers, $c\ c\ c\ c$ and $c'\ c'\ c'\ c'$, and serves as a guard for each series of rollers, and also as a side support for the pulley B. The rollers $c\ c\ c$ and $c'\ c'\ c'$ are made of such a size relatively to their length that they are guided or kept in position by the contact of their end surfaces against the sides of the chambers in which they work without the aid of any frame, pivot, or other device.

Figure 2 is a side and end view of the rollers in fig. 1.

Figure 3 represents an arrangement requiring only one series of rollers, extending through the eye of the pulley B, instead of two series, separated by a flange, as displayed in fig. 1. In this single-series arrangement the diameter of the rollers is increased in proportion to their length, whereby they retain, with increased power, their distinctive feature of self-guidance.

My improvement thus described is superior to anything in use, in that it is simple, consisting of but few parts, easily made, is strong enough for the heaviest ship or other tackle, diminishes friction, and facilitates the revolutions of any wheel or pulley with which it may be used.

What I claim as new, and desire to secure by Letters Patent, is—

1. The pulley and block, having the friction-rollers constructed and arranged so as to be self-guiding, in the manner as described.

2. The combination of the pulley A, pulley-block B, and two sets of cylindrical rollers, $c\ c\ c\ c$ and $c'\ c'\ c'\ c'$, and flange F, all constructed and used as shown and described.

3. The arrangement, in the eye of the pulley B, of two or more sets of cylindrical rollers, constructed and kept in position by means shown and described.

JOHN A. BURNAP.

Witnesses:
L. W. STOCKING
JACOB SWITZER.